April 14, 1931.   H. C. GUSTAFSON   1,800,345
TOOL RETAINER
Filed July 15, 1927   3 Sheets-Sheet 1
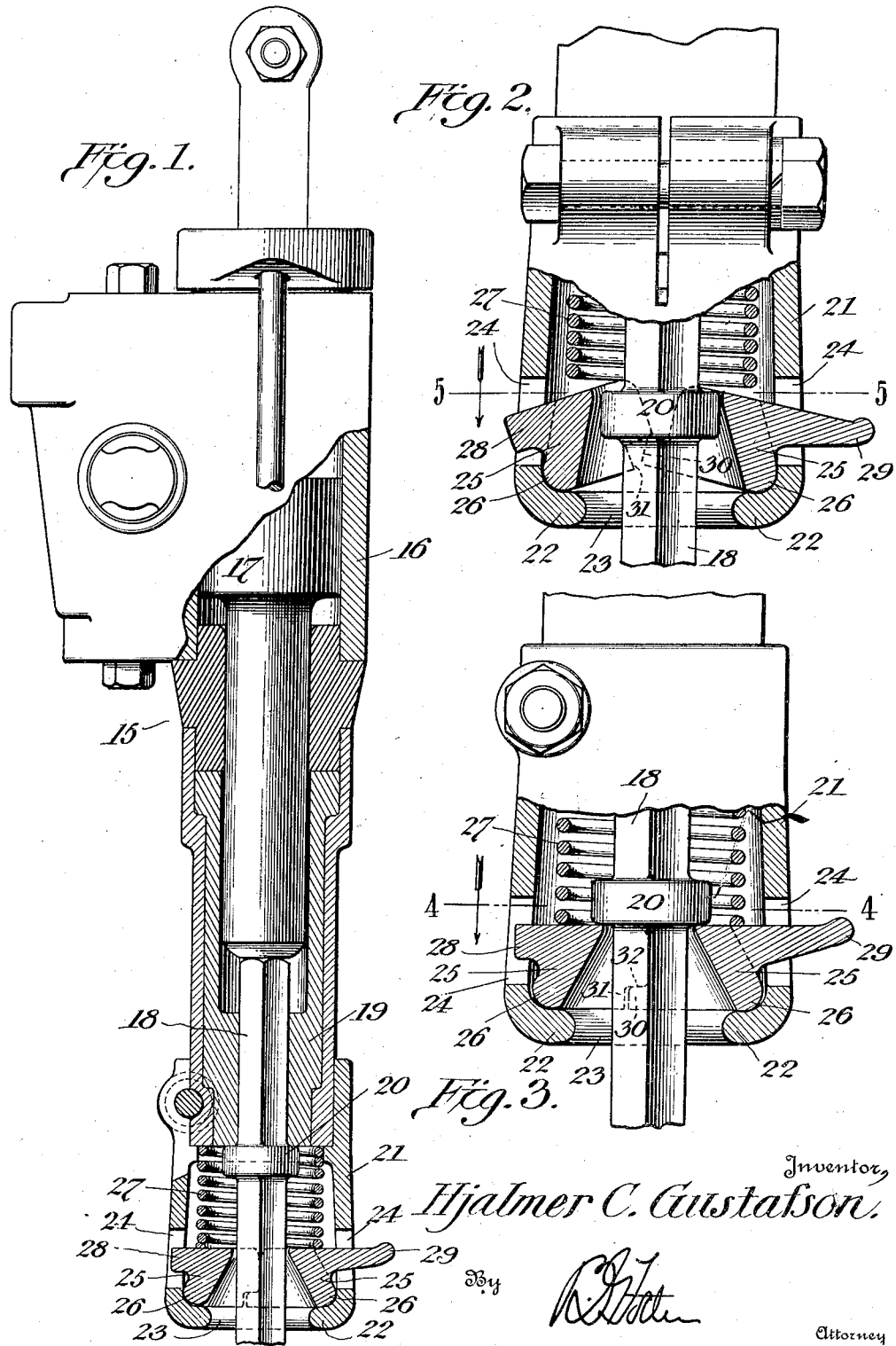
Inventor,
Hjalmer C. Gustafson
By
Attorney April 14, 1931. H. C. GUSTAFSON 1,800,345
TOOL RETAINER
Filed July 15, 1927  3 Sheets-Sheet 2
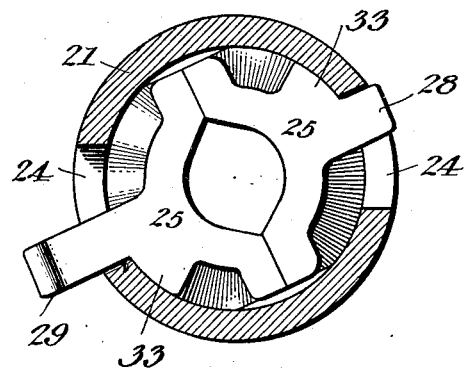
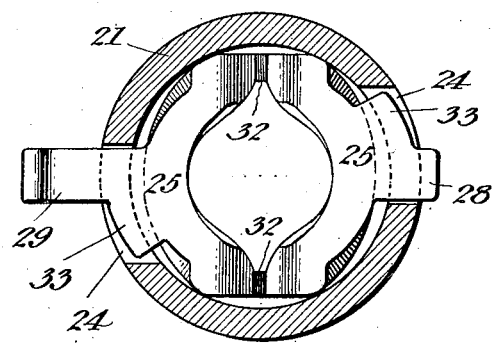
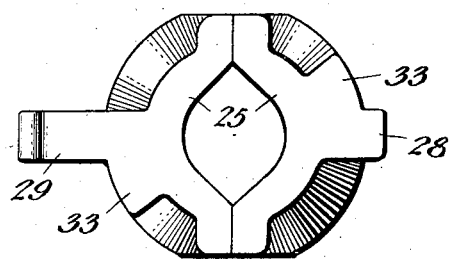
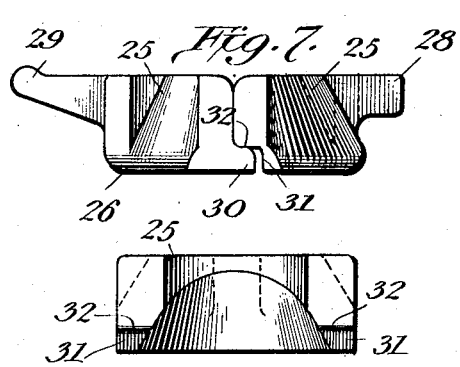
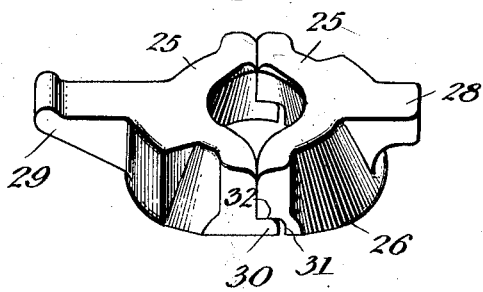
Inventor,
Hjalmer C. Gustafson.
By
Attorney

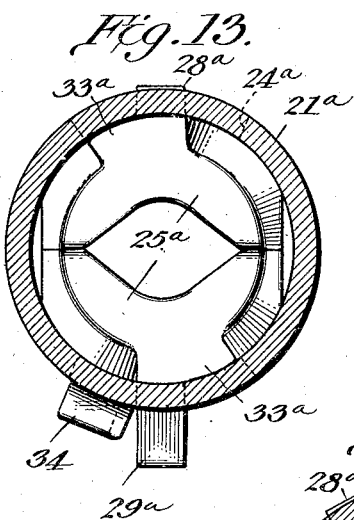
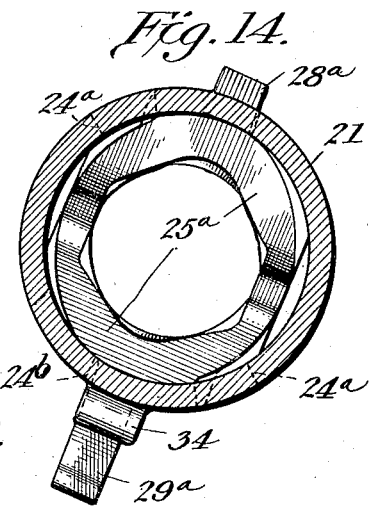
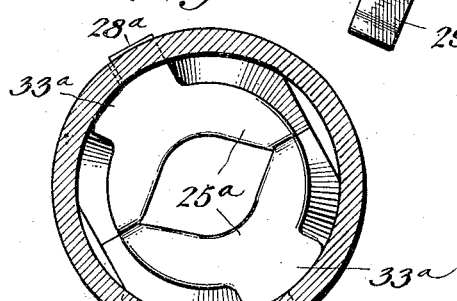
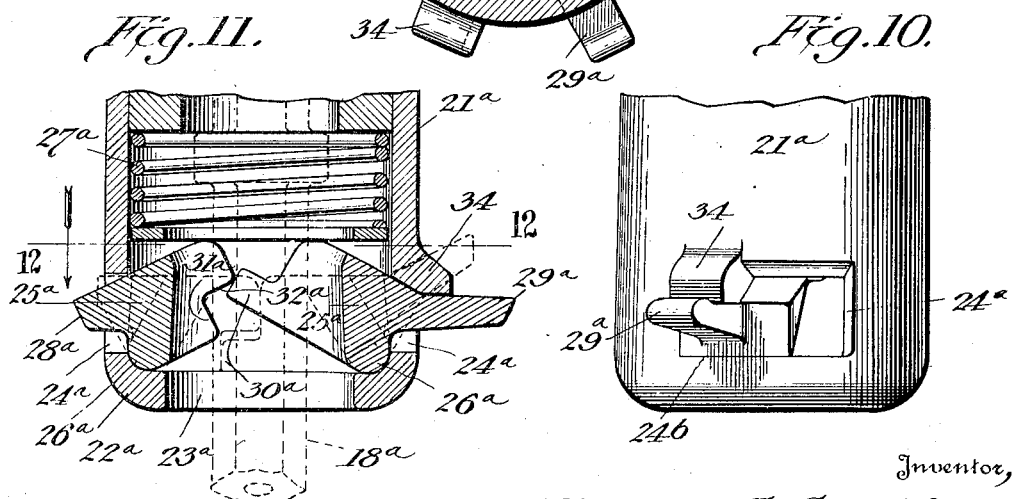

Patented Apr. 14, 1931

1,800,345

UNITED STATES PATENT OFFICE

HJALMER C. GUSTAFSON, OF DENVER, COLORADO, ASSIGNOR, BY MESNE ASSIGNMENTS, TO THE GARDNER-DENVER COMPANY, OF QUINCY, ILLINOIS, A CORPORATION OF DELAWARE

TOOL RETAINER

Application filed July 15, 1927. Serial No. 206,050.

The present invention relates to means for preventing the accidental detachment of tools from their chucks or holders, and while particularly intended for use in connection with pneumatic tools, it may be employed in other relations.

In the accompanying drawings:

Figure 1 is a sectional view through a fluid-operated tool, showing the retainer in place and in its operative position, Figure 2 is a detail sectional view of the chuck end of the tool, showing the retainer in its operative position, Figure 3 is a view similar to Figure 2, but showing the retainer elements in their active positions, Figure 4 is a horizontal sectional view taken substantially on the line 4—4 of Figure 3, Figure 5 is a cross sectional view on the line 5—5 of Figure 2, Figure 6 is a plan view of the retaining dogs in the position illustrated in Figures 3 and 4, Figure 7 is a side elevation of the parts shown in Figure 6, Figure 8 is a perspective view of the parts as shown in Figures 6 and 7, Figure 9 is an inner face view of one of the retaining dogs.

Figure 10 is a view in elevation of the housing and exposed portions of a modified form of construction, Figure 11 is a longitudinal sectional view therethrough, showing the retaining dogs in their inoperative positions, Figure 12 is a horizontal sectional view taken on the line 12—12 of Figure 11, but showing the retaining dogs in their operative positions and locked against opening, Figure 13 is a view similar to Figure 12, but showing the dogs unlocked and in position to be opened, Figure 14 is a view similar to Figures 12 and 13 but showing the dogs in their open positions or as illustrated in Figure 11.

In the embodiment disclosed in Figures 1-8 inclusive, the tool is illustrated generally at 15, and embodies a cylinder member 16, in which a reciprocatory piston hammer 17 operates. This hammer is adapted to deliver blows to the end of a drill steel 18, or other instrument that is engaged in a chuck 19, forming the front end of the tool. The steel or implement 18 is provided with a collar 20 that limits its movement into the chuck, and also is made use of in preventing the steel being detached.

A tubular housing 21 is mounted on the front end of the chuck 19, and has an inturned front wall 22 surrounding an opening 23, through which the steel 18 passes, said opening being of sufficient diameter to also permit the passage of the collar 20. The housing is provided in its opposite walls with openings 24.

Opposite retaining dogs 25 are provided that are preferably substantially semi-circular in form, and have their outer ends rounded to provide knuckles 26 that constitute pivotal bearings against the inner face of the inturned end wall 22 of the housing 21. These dogs form an inwardly tapered opening when in the position shown in Figures 1, 3 and 8, the opening being of sufficient diameter to permit the passage of the shank of the steel 18, but of less area than the collar 20. A coiled spring 27 is interposed between the front end of the chuck 19 and the rear ends of the dogs, said springs thus serving to swing the dogs forwardly or to their operative positions. One of the dogs has an outstanding extension 28 that engages in one of the openings 24 and the other has an opposite extension 29 that passes through the other opening and projects sufficiently far to form a finger-piece. The outer ends of the dogs are provided, one with a transversely extending lug 30, the other with a socket 31 to receive the same, the inner wall 32 of the socket forming a shoulder or tooth so that when the finger-piece 29 is moved forwardly, the lugs 30 bearing against the shoulders 32, will cause the simultaneous inward swinging of both dogs.

The openings 24, as shown particularly in Figure 4, are considerably wider than the extensions 28 and 29. Consequently the dogs are permitted to have a partial rotary movement. These dogs are provided on diagonally opposite sides of the extensions 28 and 29 with locking lugs 33 that are adapted to move to positions behind the wall of the housing, as shown in Figure 4, or to positions to swing into the openings 24, as shown in Figure 5.

With this construction, it will be evident that when the dogs are turned so that the holding lugs 33 are in alinement with the openings 24, by pressing outwardly upon the finger-piece 29, the dogs can be swung to open position as illustrated in Figures 2 and 5. When so opened, the collar of the steel can pass the dogs and consequently said steel can be removed or replaced. When the collar is behind the dogs and the finger-piece 29 is released, the spring will act to swing the dogs forwardly and inwardly behind the collar, or as indicated in Figures 1 and 3, thus retaining the tool in place. By turning the finger-piece 29, the dogs are caused to rotate, so that the lugs 33 are carried behind the walls of the housing, or to the position shown in Figure 4, whereupon the dogs are positively locked against opening.

Means also may be provided for locking the dogs in open or in their inoperative positions, and such a structure is shown in Figures 10 to 14 inclusive. The parts heretofore described are given the same reference numerals with the exponent "a", and it is believed need not be further described. In addition, it will be noted that the housing 21a has at one side of the opening 24a through which the finger-piece 29a passes, a lug 34 and that the opening 24a has a reduced extension 24b disposed alongside said lug. The consequence is that when the dogs are thrown to their open position, or as shown in Figure 11 and are rotated in a reverse direction to that on which they are moved to lock, then the finger-piece 29a is brought beneath the lug 34 and the parts are locked in open position, as shown in Figure 11.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim as new and desire to secure by Letters Patent, is:

1. A tool retainer comprising a housing, a tool retaining dog pivotally mounted therein and movable between an operative position and an inoperative position, and means for locking the dog in one of said positions, said dog being capable of movement on its pivot mounting in the housing transversely to its swinging movement into and out of engagement with said locking means.

2. A tool retainer comprising a housing, a tool retaining dog pivotally mounted therein and movable between an operative position and an inoperative position, and means for locking the dog in its operative position, said dog being capable of movement on its pivot mounting in the housing transversely to its swinging movement into and out of engagement with said locking means.

3. A tool retainer comprising a housing, a tool retaining dog pivotally mounted therein and movable between an operative position and an inoperative position, and means for locking the dog in its inoperative position, said dog having a mounting that permits its movement transversely to its swinging movement into and out of engagement with said locking means.

4. A tool retainer comprising a housing, a tool-retaining dog having a pivotal mounting therein and movable between an operative and an inoperative position, and means for locking the dog in one of said positions, said dog being capable of a rotary movement on its pivot mounting in the housing into and out of engagement with the locking means.

5. A tool retainer comprising a housing, a tool-retaining dog having a pivotal mounting therein and movable between an operative and an inoperative position, and a locking lug carried by the dog, said housing having an opening and a locking wall adjacent thereto, and said dog being capable of rotary movement on its pivot mounting in the housing to bring the lug behind the wall and into alinement with the opening.

6. A tool retainer comprising a housing, a tool retaining dog pivotally mounted therein and capable of swinging between an operative position and an inoperative position, an outstanding finger piece carried by the dog and projecting through the housing, and a holding shoulder on the housing, said dog being capable of rotary movement to carry the finger piece to a position into engagement with the shoulder to hold the dog against swinging movement.

7. A tool retainer comprising a housing, a tool retaining dog pivotally mounted therein and capable of swinging between an operative position and an inoperative position, an outstanding finger piece carried by the dog and projecting through the housing, and a holding shoulder on the housing, said dog being capable of rotary movement when in its inoperative position to carry the finger piece to a position into engagement with the shoulder to hold the dog against swinging movement and in said inoperative position.

8. A tool retainer comprising a housing having an opening in its side wall and provided with a lug alongside, a tool retaining dog pivotally mounted therein and capable of swinging between an operative position and an inoperative position, an outstanding finger piece carried by the dog and projecting through the opening, said dog being capable of rotary movement to carry the finger piece behind the lug when the dog is in its inoperative position and thereby hold it in said inoperative position.

9. A tool retainer comprising a housing having an opening in its side wall and provided with a lug alongside, a tool retaining dog pivotally mounted therein and capable of swinging between an operative position and an inoperative position, an outstanding finger piece carried by the dog and projecting through the opening, said dog being capable of rotary movement to carry the finger piece behind the lug when the dog is in its inoperative position and thereby hold it in said inoperative position and said dog also having a lug that is movable upon a reverse rotary movement of the dog to a position behind the wall of the housing to hold the dog in its operative position.

10. A tool retainer comprising a housing having an open end for the reception of the tool, opposite openings in its side walls and a holding lug alongside one of the openings, interfitting tool-retaining dogs having pivotal bearings in the housing and capable of rotary movement on said bearings, said dogs being capable of swinging movements between operative positions and inoperative positions and having outstanding elements engaged in the housing openings, one of said elements engaging behind the lug upon the rotation of the dogs when in inoperative positions, and lugs on said dogs that engage behind the housing walls and lock the dogs in operative positions on their rotary movement in an opposite direction.

11. A tool retainer comprising a housing, a tool retaining dog pivotally mounted therein and movable on its horizontal mounting between an operative position and an inoperative position, means for urging the dog to its operative position, and means for locking the dog in its inoperative position and against the urge of the said means.

12. A tool retainer comprising a housing, a pair of tool encircling retaining dogs pivotally mounted therein and capable of swinging between operative positions and inoperative positions, a tool encircling spring that bears on the dogs to urge them to their operative positions, and means for locking the dogs in their inoperative positions and against movement by the spring.

In testimony whereof, I affix my signature.

HJALMER C. GUSTAFSON.